United States Patent [19]
Cullen et al.

[11] Patent Number: 5,492,094
[45] Date of Patent: Feb. 20, 1996

[54] ENGINE CONTROL SYSTEM FOR MAINTAINING IDLE SPEED

[75] Inventors: Michael J. Cullen, Northville; Daniel L. Meyer, Dearborn; Alan R. Dona, Huntington Woods; Jing Sun, Novi, all of Mich.

[73] Assignee: Ford Motor Company, Dearborn, Mich.

[21] Appl. No.: 465,288

[22] Filed: Jun. 5, 1995

[51] Int. Cl.$^6$ .............................. F02D 41/16; F02P 5/15
[52] U.S. Cl. .................. 123/339.11; 60/285; 123/339.17
[58] Field of Search ......................... 123/339.11, 339.17, 123/418; 60/274, 276, 285

[56] References Cited

U.S. PATENT DOCUMENTS

| | | | |
|---|---|---|---|
| 4,144,853 | 3/1979 | Maruoka et al. | 60/285 |
| 4,399,789 | 8/1983 | Yano | 123/339.11 |
| 5,050,551 | 9/1991 | Morikawa | 60/285 X |
| 5,241,855 | 9/1993 | Cullen et al. | 73/117.3 |
| 5,303,168 | 4/1994 | Cullen et al. | 364/557 |

*Primary Examiner*—Tony M. Argenbright
*Attorney, Agent, or Firm*—Allan J. Lippa; Roger L. May

[57] ABSTRACT

An engine controller (12) controls engine idle speed via control of a bypass throttle valve (96) and an ignition timing system (88). The ignition system (88) also provides a retard in ignition timing during cold operation to rapidly warm a catalytic converter (20) coupled to the engine exhaust (48). When first entering the idle speed control mode, an initial throttle position corresponding to an initial desired inducted mass air flow is first provided as a function of predetermined conditions such as air conditioner status. This initial value (238, and 402–412) is corrected to prevent any decrease in idle speed which would otherwise occur as a result of the afore-mentioned retard in ignition timing.

9 Claims, 5 Drawing Sheets

ENGINE CONTROL SYSTEM FOR MAINTAINING IDLE SPEED

FIELD OF THE INVENTION

The field of the invention relates to engine control, and more particularly, control of an engine's idle speed and also ignition timing.

BACKGROUND OF THE INVENTION

Idle speed control systems are known which control engine idle speed by both ignition timing control and control of a bypass throttle valve. When the idle speed control mode is first entered, an initial bypass throttle position is generated as a function of predetermined conditions such as air conditioner status. This initial or open loop value is then adjusted by a feedback signal derived from a difference between desired engine speed and actual engine speed. Ignition timing is also adjusted by the feedback signal to provide faster corrections than obtainable by bypass throttle control alone. Such a control system is disclosed in U.S. Pat. No. 5,303,168.

Engine control systems are also known which retard ignition timing during cold operation to more rapidly warm the catalytic converter. Such a system is disclosed in U.S. Pat. No. 4,144,853.

The inventors herein have recognized numerous problems with the above approaches. One such problem is that the retard in ignition timing for rapid converter heating, may also cause a decrease in desired idle speed provided by the initial throttle position. Stated another way, the inventors herein have recognized that the initial throttle position requires correction for the retarded ignition timing provided to rapidly heat the converter.

SUMMARY OF THE INVENTION

An object of the invention claimed herein is to provide rapid warm up of the catalytic converter by ignition timing retard without incurring an undesired decrease in idle speed when the idle speed mode is first commenced.

The problems of prior art approaches are overcome, and the objects and advantages of the claimed invention achieved, by providing a control system and method for an engine having an ignition system responsive to an ignition signal, a bypass throttle valve responsive to a throttle position signal for engine idle speed control, and an exhaust coupled to a catalytic converter. In one particular aspect of the invention, the method comprises the steps of: setting the throttle position signal to an initial throttle position value based on predetermined conditions to approach a desired engine idle speed; adjusting the throttle position signal in response to a difference between actual engine idle speed and the desired engine idle speed; retarding the ignition signal during cold engine operation to increase exhaust gas temperature for rapid warmup of the converter; and correcting the initial throttle position value as a function of amount of the ignition signal retard during said retarding step.

An advantage of the above aspect of the invention is that the initial throttle position is corrected to avoid any initial decrease in idle speed which would otherwise occur by the ignition timing retard.

In another aspect of the invention, the control system comprises: an ignition system responsive to an ignition signal; a bypass throttle valve for engine idle speed control responsive to a throttle position signal having a duty cycle related to a desired quantity of air to be inducted through the bypass throttle valve; open loop means for setting the desired air quantity signal to an initial air quantity value based on predetermined conditions to approach a desired engine idle speed; feedback means for adjusting the desired air quantity signal in response to a difference between actual engine idle speed and the desired engine idle speed; the ignition system retarding the ignition signal during cold engine operation by a preselected amount to increase exhaust gas temperature for rapid warmup of the converter; and correction means for correcting the initial air quantity value as a function of the preselected retard amount during the retarding step to compensate for loss of engine idle speed which the ignition timing retarding step would otherwise cause.

An advantage of the above aspect of the invention, is that the initial idle throttle position is corrected to avoid any initial decrease in idle speed which would otherwise occur by the ignition timing retard.

BRIEF DESCRIPTION OF THE DRAWINGS

The object and advantages of the claimed invention will become more clearly apparent from the following detailed description of an example of operation described with reference to the drawings wherein:

DESCRIPTION OF THE PREFERRED EMBODIMENTS

Figure 1:
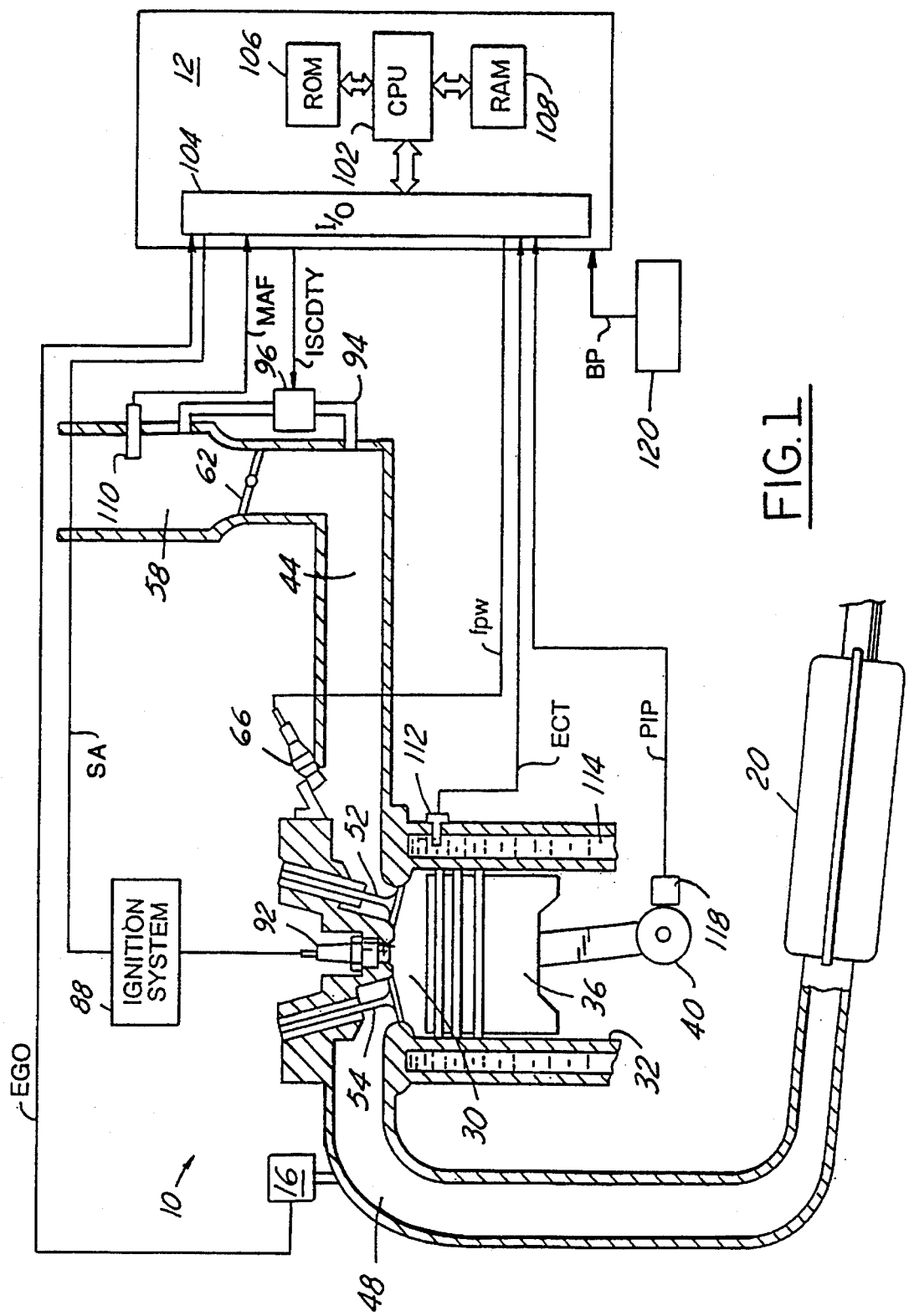
FIG. 1 is block diagram of an embodiment in which the invention is used to advantage.

Internal combustion engine 10 comprising a plurality of cylinders, one cylinder of which is shown in FIG. 1, is controlled by electronic engine controller 12. In general terms which are described later herein with particular reference to FIGS. 2A–2B, and 3–5, controller 12 controls engine ignition timing and idle speed to provide rapid warmup of catalytic converter 20 while concurrently controlling bypass throttle valve 96 to control idle speed.

Continuing with FIG. 1, engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Intake manifold 44 is also shown having fuel injector 66 coupled thereto for delivering liquid fuel in proportion to the pulse width of signal fpw from controller 12. Fuel is delivered to fuel injector 66 by a conventional fuel system (not shown) including a fuel tank, fuel pump, and fuel rail (not shown).

Conventional distributorless ignition system 88 provides ignition spark to combustion chamber 30 via spark plug 92 in response to spark advance signal SA from controller 12.

Catalytic type exhaust gas oxygen sensor 16 is shown coupled to exhaust manifold 48 upstream of catalytic converter 20. Sensor 16 provides signal EGO to controller 12 which converts signal EGO into a two-state signal. A high voltage state of converted signal EGO indicates exhaust gases are rich of a desired air/fuel ratio and a low voltage state of converted signal EGO indicates exhaust gases are lean of the desired air/fuel ratio. Typically, the desired air/fuel ratio is selected as stoichiometry which falls within the peak efficiency window of catalytic converter 20.

Idle bypass passageway 94 is shown coupled between throttle body 58 and intake manifold 44 via solenoid valve 96. Controller 12 provides pulse width modulated signal ISDC to solenoid valve 96 so that airflow is inducted into engine 10 at a rate proportional to the duty cycle of signal ISDC.

Controller 12 is shown in FIG. 1 as a conventional microcomputer including: microprocessor unit 102, input/output ports 104, read only memory 106, random access memory 108, and a conventional data bus. Controller 12 is shown receiving various signals from sensors coupled to engine 10, in addition to those signals previously discussed, including: measurements of inducted mass air flow (MAF) from mass air flow sensor 110 coupled to throttle body 58; engine coolant temperature (ECT) from temperature sensor 112 coupled to cooling sleeve 114; a profile ignition pickup signal (PIP) from Hall effect sensor 118 coupled to crankshaft 40.

Figure 2A:
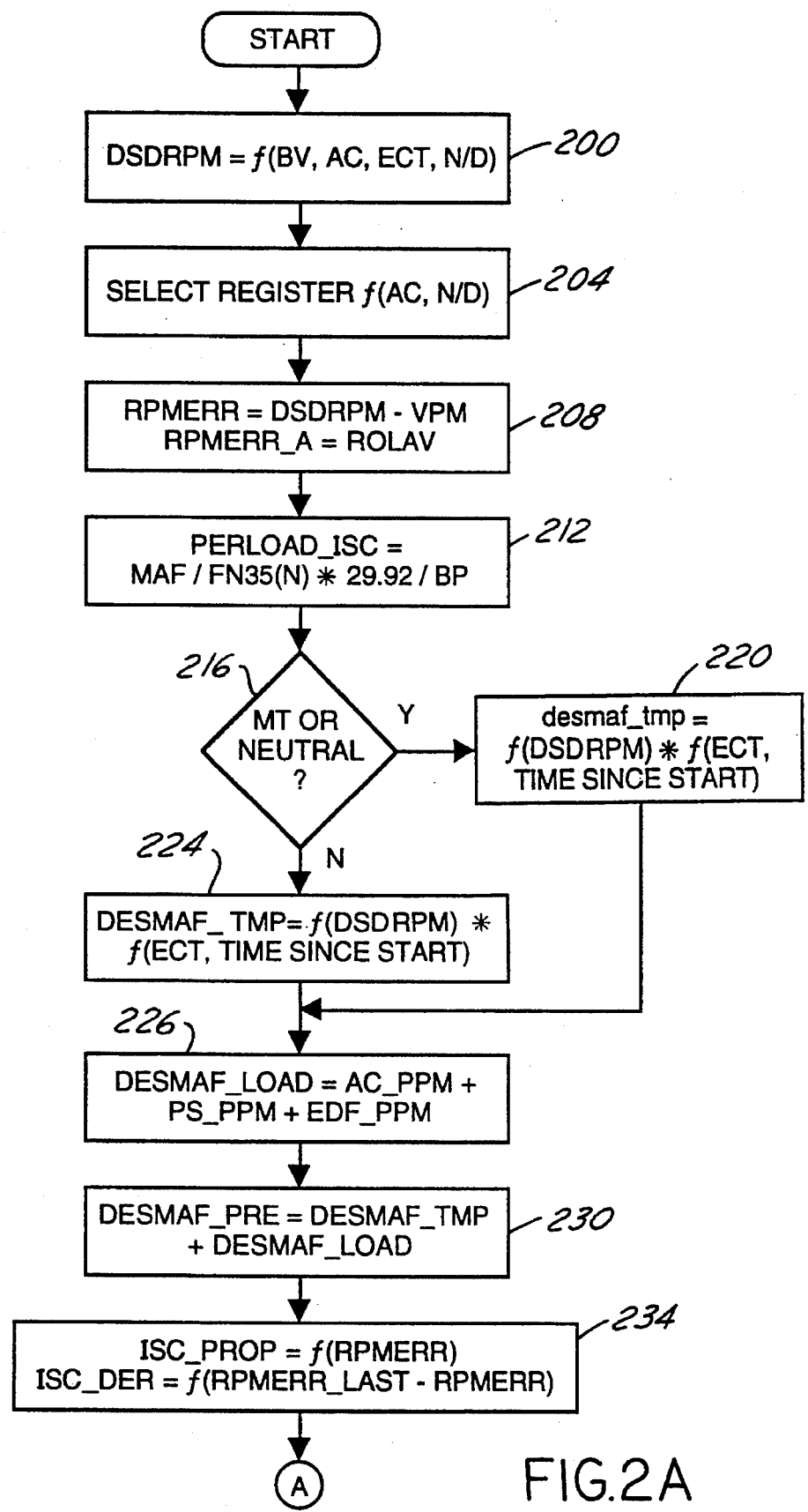
FIGS. 2A–2B, and 3–5 are flow charts of various operations performed by portions of the embodiment shown in FIG. 1.
Figure 2B:
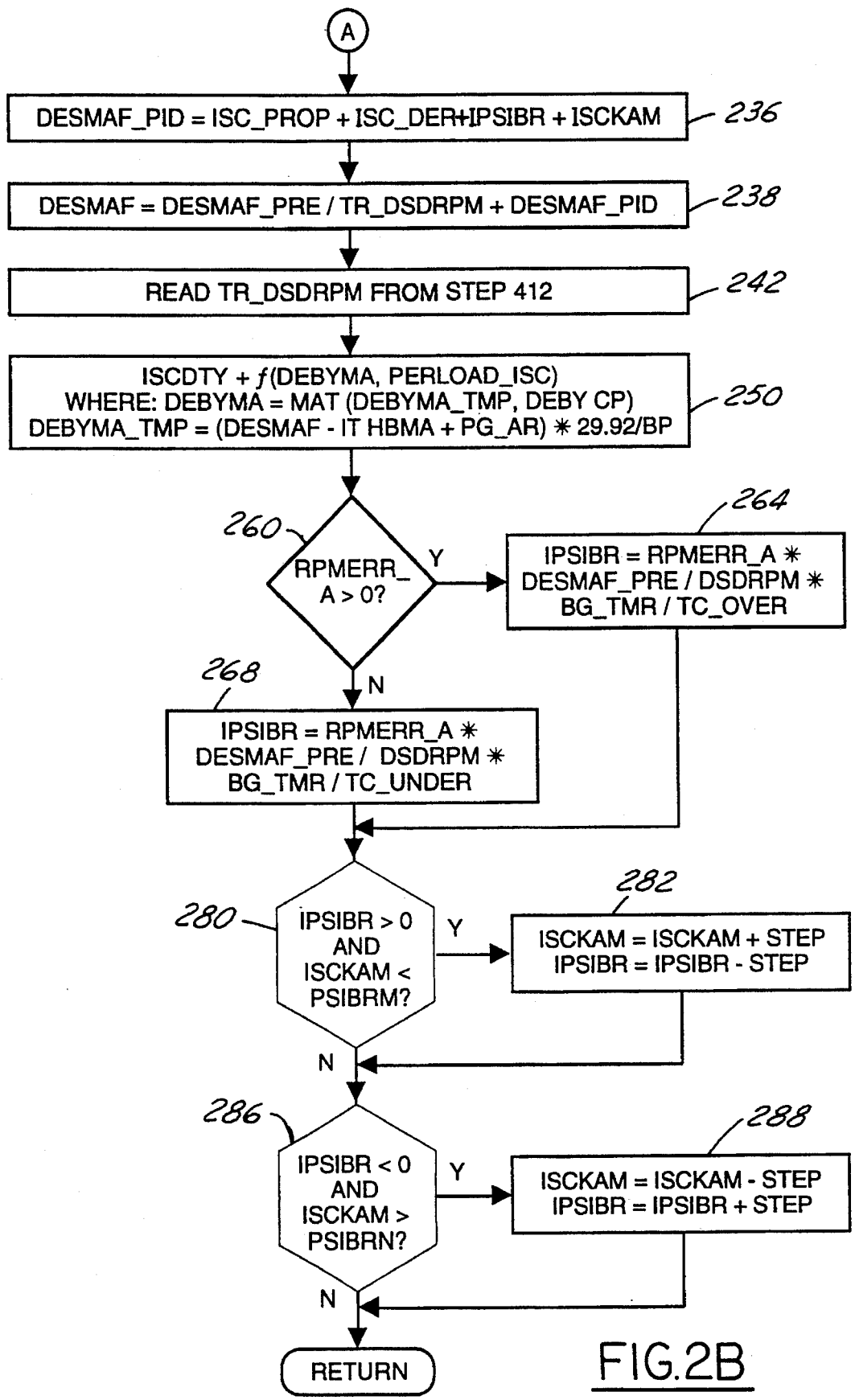
Figure 3:
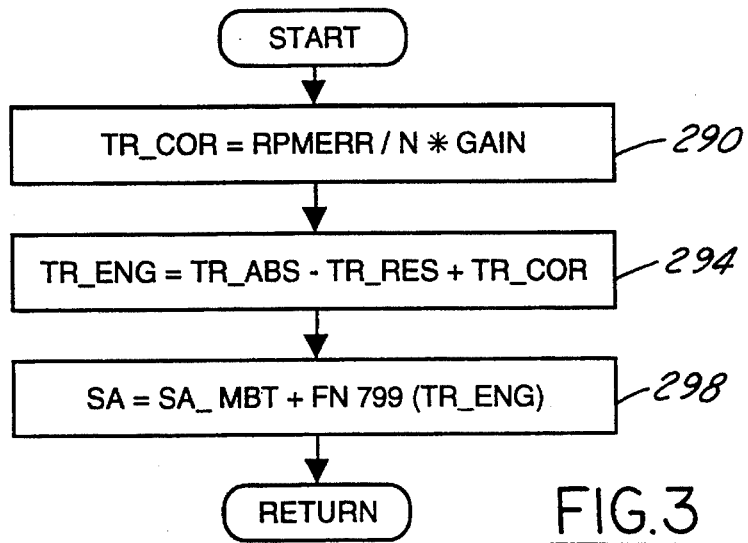

Referring now to FIGS. 2A–2B and 3, the subroutines executed by controller 12 for controlling engine idle speed are now described. Referring first to FIGS. 2A–2B, desired idle speed signal DSDRPM is first calculated as a function of battery voltage BV, air conditioner enable signal AC, engine coolant temperature ECT and the neutral or drive transmission signal N/D (step 200). One of four storage registers is selected in step 204 as a function of signal AC, and signal N/D. More specifically, the following registers are selected: a first register is selected if the transmission is not in drive and the air conditioner is on; a second register is selected if the air conditioner is off and the transmission is in drive; a third register is selected if the transmission is in neutral and the air conditioner is on; and a fourth register is selected if the transmission is in neutral and the air conditioner is off.

Idle speed error signal RPMERR is calculated in step 208 by subtracting indication of engine speed signal rpm from desired idle speed signal DSDRPM. Signal RPMERR_A is also generated which is a rolling average of signal RPMERR with exponential smoothing. During step 212, an estimate of the pressure ratio across air bypass valve 96 is provided. More specifically, signal PERLOAD_ISC is calculated by dividing a value (FN35) related to the peak air charge at wide open throttle into signal MAF. The resulting quotient is then multiplied by the ratio of 29.92 to barometric pressure BP.

If the vehicle has a manual transmission (MT) or an automatic transmission which is in neutral (step 216), desired air flow signal DESMAF_tmp is generated in step 220 as follows. A function of desired idle speed (DSDRPM) is multiplied times a function of engine coolant temperature (ECT). The resultant product is multiplied by time since engine start. On the other hand, if the answer to step 216 is negative, signal DESMAF_TMP is generated in step 224 as follows. A function of desired idle speed DSDRPM is multiplied by another function of engine coolant temperature (ECT) and the time since start.

Correction factor DESMAF_LOAD for desired mass air flow at various loads is generated during step 226. More specifically, signal DESMAF_LOAD is generated by summing signal AC_PPM when the air conditioner is on, signal PS_PPM when power steering is employed, and signal EDF_PPM when a cooling fan is activated (step 226). Open loop prediction of desired air flow (signal DESMAF_PRE) is generated during step 230 by adding previously calculated signal desmaf_tmp and signal DESMAF_LOAD.

Open loop prediction of desired air flow (signal DESMAF_PRE) is corrected by signal TR_DSDRPM which is generated from the subroutine described later herein with particular reference to FIG. 5. In general, signal TR_DSDRPM provides a correction to the open loop desired air flow and corresponding open loop bypass throttle position of bypass throttle valve 96. This correction preventing any initial droop in idle speed which would otherwise occur upon commencement of idle speed control under conditions when ignition timing is being retarded for rapid converter warmup.

Desired mass air flow DESMAF is generated from a proportional plus integral controller as now described with reference to steps 234–238 in FIGS. 2A–2B. Proportional and derivative control gains are first generated. Proportional gain ISC_PROP is generated as a function of rpm and error signal RPMERR. Derivative term ISC_DER is generated as a function of the difference between rpm error signal RPMERR for the present and preceding background loops (step 234). Desired air flow signal DESMAF_PID from the proportional plus integral controller (236) is generated by summing proportional term ISC_PROP with the sum of derivative term ISC_DER, integral error term IPSIBR, and adding adapted integral term ISCKAM (step 236). Total desired air bypass flow DESMAF is then generated by adding proportional plus derivative output signal DESMAF_PID to the ratio of signal DESMAF_PRE to signal TR_DSDRPM (step 238).

Air bypass duty cycle signal ISCDTY is calculated in step 250 as a function of the air bypass valve versus duty cycle and pressure ratio. More specifically, signal ISCDTY is generated as a function of signals DEBYMA and signal PERLOAD_ISC. Signal PERLOAD_ISC was generated as previously described with reference to step 212. Signal DEBYMA is generated as the maximum of calibratable maximum DEBYCP and signal DEBYMA_TMP. As shown in step 250, signal DEBYMA_TMP is generated the ratio of 29.92 over barometric pressure BP times the difference between signal DESMAF and the sum of signal ITHBMA and signal PG_AR. It represents additional air induction by air leakage past the throttle plate (ITHBMA) and by purge air (PG_AR).

If the rolling average of the engine speed error signal (RPMERR_A) is positive (step 260), then integral error term IPSIBR is generated as shown in the following equation:

IPSIBR=RPMERR_A * DESMAF_PRE/DSDRPM * BG_TMR/ TC_OVER where: BG_TMR is the background loop time; and TC_OVER is a calibratable time constant for overspeed.

On the other hand, when signal RPMERR_A is negative, the integral error term is calculated by the following equation:

IPSIBR=RPMERR_A * DESMAF_PRE/DSDRPM * BG_TMR/ TC_UNDER where: TC_UNDER is a calibratable time constant for underspeed.

When integration term IPSIBR is positive and adaptive air flow corrections ISCKAM are less than minimum clip value PSIBRN (step 280), air flow corrections ISCKAM and integral term IPSIBR are generated by the equations shown in Step 282 as follows:

ISCKAM=ISCKAM (previous)+STEP

IPSIBR=IPSIBR (previous)−STEP where: STEP is a calibratable step size.

When integral term IPSIBR is negative and air flow correction term ISCKAM is greater than minimum clip PSIBRN (step 286), air flow correction terms ISCKAM and integral term IPSIBR are generated by the equations shown in Step 288 as follows:

ISCKAM=ISCKAM (previous)−STEP

IPSIBR=IPSIBR (previous)+STEP

Referring now to FIG. 3, a subroutine for correcting idle speed in response to speed error signal RPMERR by advancing or retarding ignition timing is now described. Control of engine idle speed by ignition timing provides a faster correction than is provided by control of air bypass valve 96 and, therefore, supplements such air bypass control. In this particular example, torque, correction signal TR_COR is calculated by dividing engine speed (N) into speed error signal RPMERR and multiplying the resulting quotient times a gain value as shown in step 290. The final desired torque ratio (TR_ENG) is then calculated by adding torque correction signal TR_COR to the difference between signal TR_ABS and signal TR_RES (step 294). Signal TR_ABS represents the torque ratio at absolute spark advance. And signal TR_RES is a reserved torque ratio provided for an increased range of authority of the idle speed control feedback loop.

Ignition timing signal SA is generated in step 298 by correcting ignition timing at MBT with signal FN799 (TR_ENG). In this example, signal FN799 (TR_ENG) is the ignition timing retard from MBT utilized to achieve desired torque ratio TR_ENG.

Figure 4:
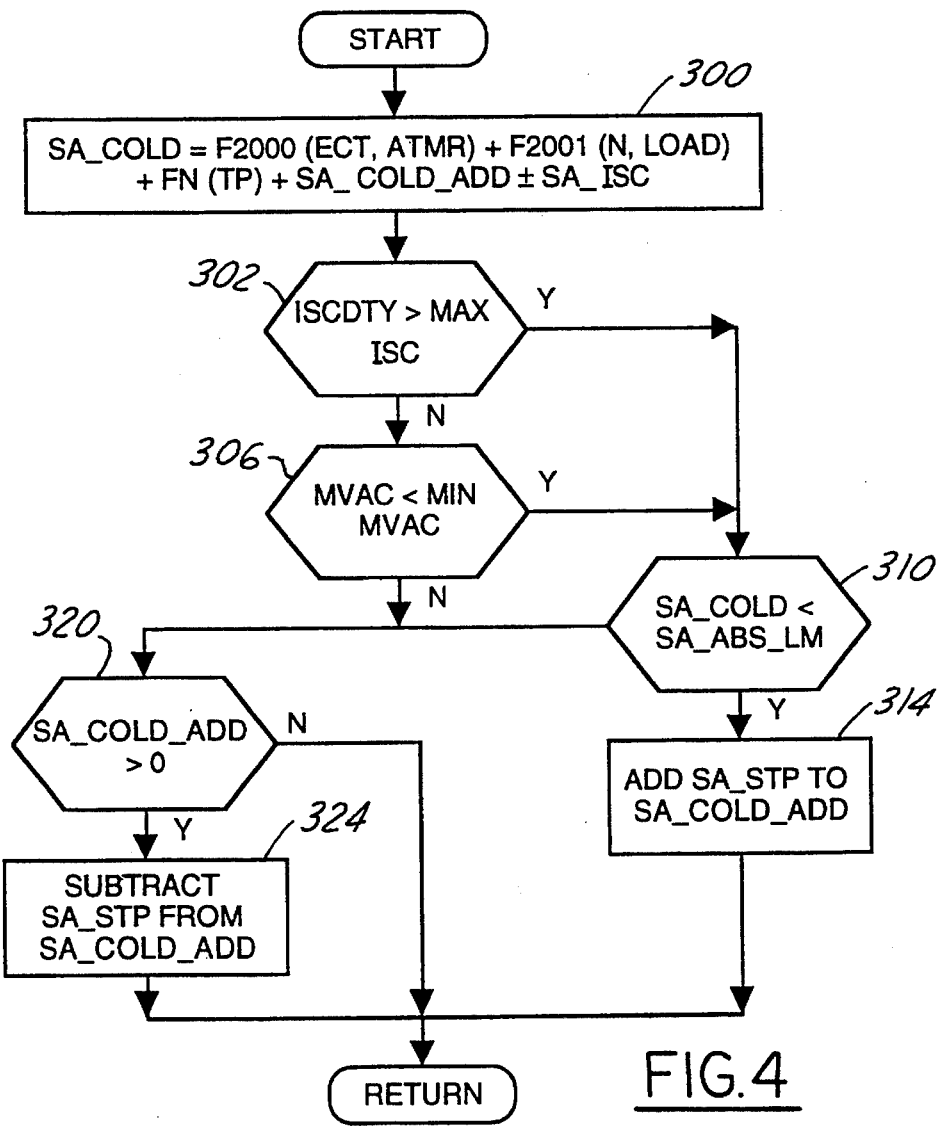

A subroutine executed by controller 12 for controlling ignition timing is now described with particular reference to FIG. 4. In the particular example shown herein, ignition timing is controlled during cold engine operation such that spark advance or ignition timing signal SA is provided as signal SA_COLD. Those skilled in the art, however, will recognize that the invention claimed herein is applicable to other forms of ignition timing control. For example, the claimed invention is applicable whenever the ignition timing is retarded such as during idle speed control, or knock control.

As described in greater detail below, the ignition timing signal SA_COLD is generated at a retarded value from nominal or base ignition timing to more rapidly heat catalytic converter 20. In addition to retarding ignition timing, engine air/fuel ratio is also enleaned to provide more oxygen in the engine exhaust thereby further enhancing catalyst warmup during cold engine operation.

Continuing with FIG. 4, ignition timing signal SA_COLD is generated in step 300 by the following equation:

SA_COLD=F2000(ECT,ATME)+F2001 (N, LOAD) +FN(TP)+ SA_COLD_ADD±SA_ISC where:
F2000(ECT,ATME) is a function of engine coolant temperature (ECT) and time since engine start (ATME);
F2001(N, LOAD) is a function of engine speed and load;
FN(TP) is a function of throttle tip-in;
SA_COLD_ADD is an adjustment value generated as described below 4; and SA_ISC is an ignition timing advance or retarded provided by the idle speed control subroutine described previously with reference to FIG. 3.

When idle speed control duty cycle signal ISCDTY is greater than maximum value MAXISC (step 302), step 310 is entered. Value MAXISC is the maximum range of authority for controlling idle speed by controlling air flow through bypass valve 96.

During step 310 and 314, signal SA_COLD_ADD is advanced by step SA_STP (step 314) if ignition timing signal SA_COLD has not reached its maximum absolute limit SA_ABS_LM (step 310). Stated another way, if idle speed control duty cycle ISCDTY has reached the maximum limit so that engine speed can no longer be increased by increasing the duty cycle controlling bypass valve 96 (step 302), and ignition timing SA_COLD has not reached its absolute limit (step 310), then engine idle speed is increased by advancing ignition timing as shown in step 314.

Ignition timing signal SA_COLD is also advanced (steps 310 and 314) when the vacuum of intake manifold 44 (MVAC) is less than minimum desired value MINMVAC (step 306). Stated another way, engine ignition timing is advanced to prevent manifold vacuum MVAC from falling below a minimum desired vacuum provided ignition timing has not reached its absolute limit (step 310).

When idle speed duty cycle ISCDTY has not reached maximum value MAXISC (step 302), and manifold vacuum MVAC is above minimum value MINMVAC (step 306), ignition timing signal SA_COLD_ADD is retarded by step SA_STP (step 324). This continues each background loop until the amount of ignition advance previously added (SA_COLD_ADD) is forced to zero (step 320). Stated another way, when idle speed duty cycle ISCDTY and manifold vacuum MVAC have not reached their limits, ignition timing is retarded to reduce any ignition timing advance previously added to keep duty cycle ISCDTY and manifold vacuum MVAC within their limits.

Figure 5:
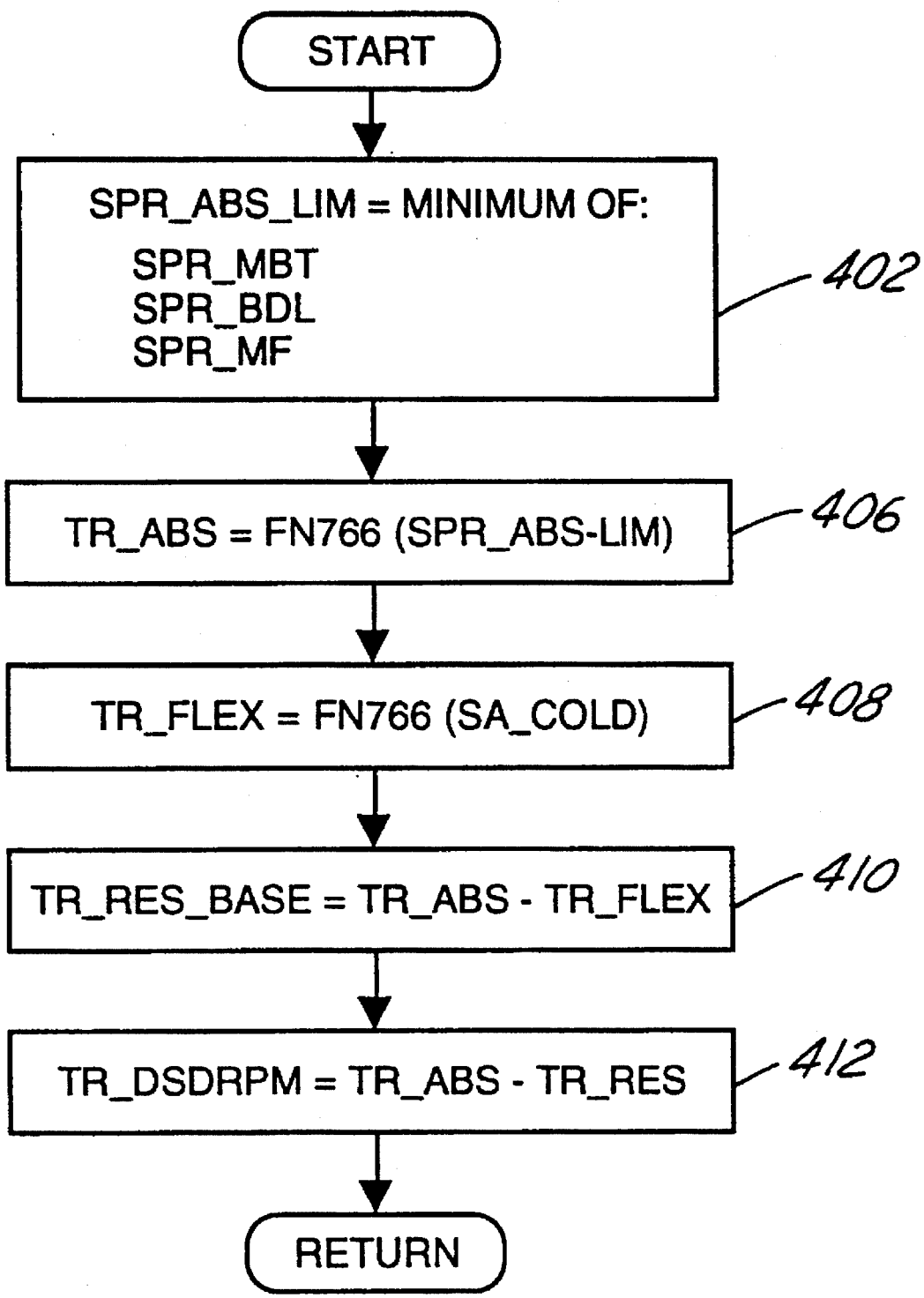

Referring now to FIG. 5, the subroutine for generating correction signal TR_DSDRPM to correct open loop desired air flow signal DESMAF_PRE and the corresponding initial throttle position of bypass throttle valve 96 is now described. An absolute limit of ignition timing (signal SPK_ABS_LIM) is first selected in step 402 as the minimum of: ignition timing at maximum engine torque MBT (signal SPK_MBT), ignition timing associated with borderline knock (signal SPK_BDL); and ignition timing associated with engine misfire (signal SPK_MF).

The above generated spark absolute limit (SPK_ABS_LIM) is then converted to torque ratio TR_ABS by conversion function FN766 during step 406. In this particular example, conversion function FN766 is a table of engine output torque as a function of ignition timing.

Ignition signal SA_COLD, which is the previously described ignition timing retard to rapidly warm converter 20, is converted in step 408 to torque ratio TR_FLEX by function FN766. Torque ratio TR_FLEX is the flexible torque ratio limit which may be exceeded if required to maintain engine idle speed. Reserved torque ratio TR_RES_BASE, which corresponds to a reserve in ignition timing to maintain a desired range of authority for engine idle speed control via ignition timing, is then generated in step 410 by taking the difference between torque ratio TR_ABS and torque ratio TR_FELX.

During step 412, the correction value associated with the torque ratio at desired engine speed (TR_DSDRPM) is generated by taking the difference between absolute torque ratio TR_ABS and reserve torque ratio TR_RES. As previously described herein, torque ratio TR_DSDRPM provides a correction to the open loop or initial desired mass air flow value to be inducted through bypass throttle valve 96. A correction is thereby provided for initial droops in engine speed which would otherwise be caused by the ignition timing retard (SA_COLD) for rapidly warming converter 20.

The reading of the foregoing example of an embodiment which utilizes the invention by those skilled in the art will bring to mind various possible alterations and modifications without departing from the spirit and scope of the invention claimed herein. It is, therefore, intended that the following claims include all such alterations and modifications within the scope of the invention.

We claim:

1. A control method for an engine having an ignition system responsive to an ignition signal, a bypass throttle valve responsive to a throttle position signal for engine idle speed control, and an exhaust coupled to a catalytic converter, comprising the steps of:

setting the throttle position signal to an initial throttle position value based on predetermined conditions to approach a desired engine idle speed;

adjusting the throttle position signal in response to a difference between actual engine idle speed and said desired engine idle speed;

retarding the ignition signal; and correcting said initial throttle position value as a function of amount of said ignition signal retard during said retarding step.

2. The control method recited in claim 1 wherein said predetermined conditions include air conditioner status.

3. The control method recited in claim 1 further comprising a step of adjusting the ignition signal in response to said difference between said actual engine idle speed and said desired engine idle speed.

4. A control method for an engine having an ignition system responsive to an ignition signal, a bypass throttle valve responsive to a throttle position signal for engine idle speed control, and an exhaust coupled to a catalytic converter, comprising the steps of:

generating the throttle position signal with a duty cycle related to a desired quantity of air to be inducted through the bypass throttle valve;

setting said desired air quantity signal to an initial air quantity value based on predetermined conditions to approach a desired engine idle speed;

adjusting said desired air quantity signal in response to a difference between actual engine idle speed and said desired engine idle speed;

retarding the ignition signal during cold engine operation by a preselected amount to increase exhaust gas temperature for rapid warmup of the converter; and correcting said initial air quantity value as a function of said preselected retard amount during said retarding step to compensate for loss of engine idle speed which said ignition timing retarding step would otherwise cause.

5. The control method recited in claim 4 wherein said correction step further comprises the steps of correcting said initial air quantity by an engine torque ratio which is provided as a function of said preselected retard amount.

6. The control method recited in claim 4 wherein said predetermined conditions include air conditioner status.

7. A control system for an engine having an exhaust coupled to a catalytic converter, comprising:

an ignition system responsive to an ignition signal;

a bypass throttle valve for engine idle speed control responsive to a throttle position signal having a duty cycle related to a desired quantity of air to be inducted through the bypass throttle valve;

open loop means for setting said desired air quantity signal to an initial air quantity value based on predetermined conditions to approach a desired engine idle speed;

feedback means for adjusting said desired air quantity signal in response to a difference between actual engine idle speed and said desired engine idle speed;

said ignition system retarding the ignition signal during cold engine operation by a preselected amount to increase exhaust gas temperature for rapid warmup of the converter; and correction means for correcting said initial air quantity value as a function of said preselected retard amount during said retarding step to compensate for loss of engine idle speed which said ignition timing retarding step would otherwise cause.

8. The control system recited in claim 7 wherein said feedback means further comprises means for adjusting the ignition signal in response to said difference between said actual engine idle speed and said desired engine idle speed.

9. The control system recited in claim 7 wherein said correction means further provides for correcting said initial air quantity by an engine torque ratio which is provided as a function of said preselected retard amount.

* * * * *